Patented July 10, 1951

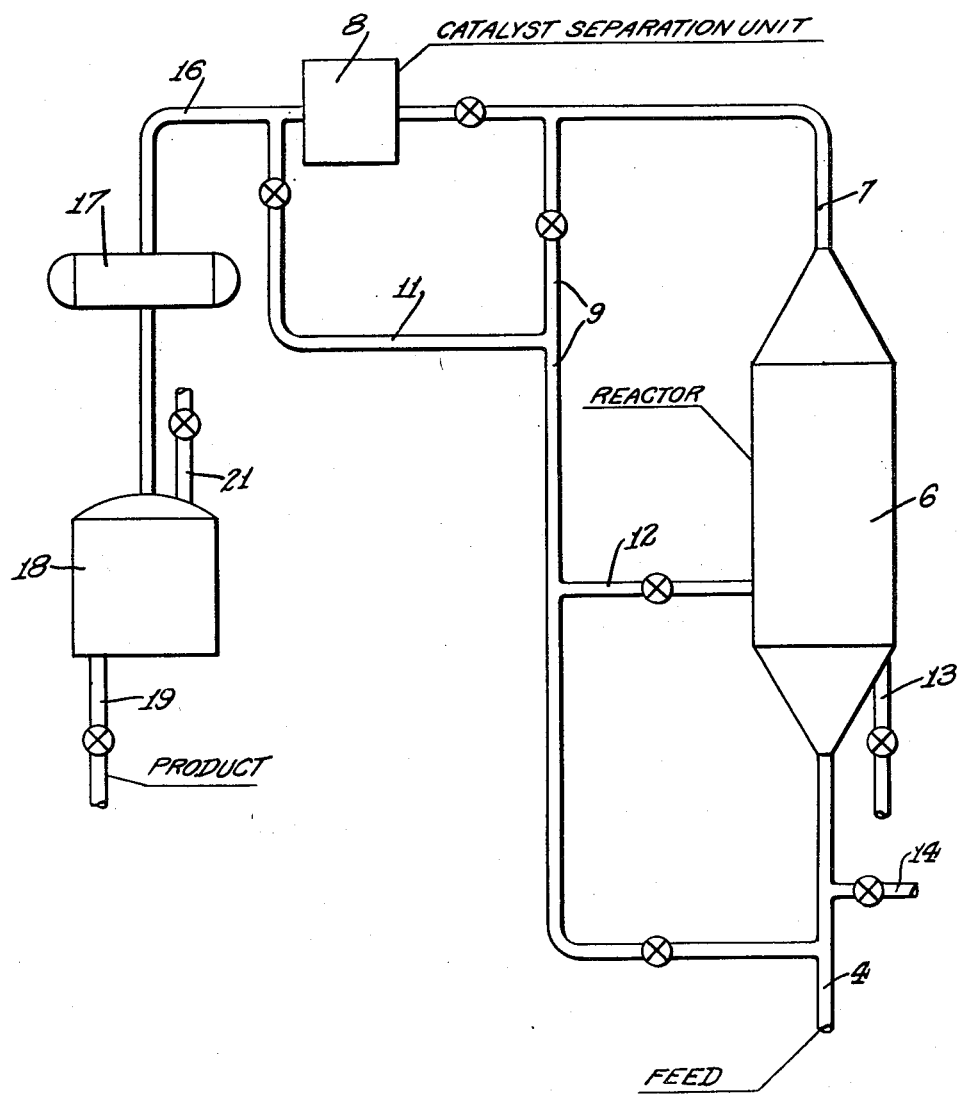

2,560,171

UNITED STATES PATENT OFFICE 2,560,171

SYNTHESIS OF ORGANIC COMPOUNDS

Luther R. Hill, Ridgewood, N. J., assignor to The M. W. Kellogg Company, Jersey City, N. J., a corporation of Delaware Application March 3, 1947, Serial No. 731,899

3 Claims. (Cl. 260—449.6)

This invention relates to an improved method for hydrogenating carbon oxides to produce hydrocarbons and oxygenated organic compounds. In one aspect this invention relates to the hydrogenation of carbon monoxide in the presence of a hydrogenation catalyst under conditions such that organic compounds having more than one carbon atom per molecule are produced. The improved process is applicable also in reacting hydrogen with other organic compounds containing the carbonyl group and herein designated as carbon oxides, whose reaction with hydrogen is promoted by catalysts which are effective with carbon monoxide, such as carbon dioxide, ketones, aldehydes, acyl halides, organic acids and their salts and esters, acid anhydrides, and amines. In the following description of the invention the hydrogenation of carbon monoxide will be referred to specifically. It will be understood, however, that the invention is of wider application including within its scope the hydrogenation of any suitable carbon oxide.

It has been known for some time that hydrogen and carbon monoxide may be made to react exothermically in the presence of catalyst under specific reaction conditions to form hydrocarbons and oxygenated compounds. In general, the synthesis of these organic compounds by the hydrogenation of carbon monoxide is accomplished in the presence of a metal or an oxide of a metal chosen from group VII of the periodic table as a catalyst, at pressures below about 500 pounds per square inch gage and at temperatures below about 750° F. for the production of both hydrocarbons and oxygenated organic compounds, and at pressures between about 1000 and about 10,000 pounds per square inch gage and at temperatures above 750° F. for the synthesis of oxygenated compounds as the major product.

The synthesis feed gas or reaction mixture comprises a mixture of about 1 to 2 mols of hydrogen to 1 mol of carbon monoxide and may be prepared by the catalytic conversion of natural gas, steam, and carbon dioxide.

Of the various methods utilized to effect the hydrogenation of carbon monoxide, such as by fixed or stationary catalyst technique, or by finely divided fluidized catalyst technique, this invention has particular application to the finely divided fluidized catalyst technique in which the conversion of carbon monoxide is substantially complete per pass through the reaction zone.

This invention is a continuation-in-part of my co-pending application Serial No. 726,620, filed February 5, 1947, in which myself and Henry G. McGrath are co-inventors.

It is an object of this invention to provide an improved process flow for the synthesis of organic compounds.

It is another object of this invention to simplify and reduce the cost of operation for the synthesis of hydrocarbons and oxygenated compounds by reaction of hydrogen with carbon monoxide.

Still another object of this invention is to provide a carrying medium for returning catalyst to the reaction zone of a synthesis process.

Various other objects and advantages of the present invention will become apparent to those skilled in the art from the accompanying description and disclosure.

This invention relates to a process for the hydrogenation of carbon oxides which comprises continuously flowing a gaseous mixture comprising hydrogen and a carbon oxide through a reaction zone in contact with a mass comprising a finely divided hydrogenation catalyst under conditions such that the catalyst mass is suspended or entrained in the flowing gaseous mixture, maintaining conditions of temperature, pressure, and reactant concentration such that organic compounds are produced, removing an effluent from the reaction zone and removing any entrained catalyst therefrom, recycling a portion of said effluent to the reaction zone prior to any condensation of the effluent, and subsequently cooling and condensing the remainder of the effluent to recover organic compounds therefrom as products of the process.

According to this invention a portion of the effluent is recycled to the reaction zone prior to any condensation treatment thereof, or the effluent may be recycled to the feed to the reaction zone in order to preheat the feed. The recycle effluent may be cooled, if desired, to the required temperature before introducing it into the reaction zone itself or before commingling it with the feed prior to introduction into the reaction zone, although cooling of the recycle gas may not be necessary under many circumstances. The recycling of the effluent prior to condensation thereof is particularly beneficial since it eliminates processing a large portion of the effluent which is ordinarily cooled to a temperature sufficiently low to condense at least a portion of the effluent before recycling. By recycling to the feed a portion of the effluent at a relatively high temperature, the necessity of preheating the feed will often be eliminated as sufficient sensible heat will be available in the recycle stream to heat the incoming mixture to the desired temperature. The feed is usually preheated for one reason to prevent relatively cold gas from contacting relatively hot catalyst.

This invention in its preferred form involves flowing a gaseous mixture comprising hydrogen and a carbon oxide to be hydrogenated upwardly in a reaction zone in contact with a mass of finely divided hydrogenation catalyst. The hydrogen and carbon oxide reactants are passed as gases through the reaction zone, under conditions effective to react all, or at least a major proportion, of the carbon oxide reactant. The gaseous mixture is passed upwardly through the mass of catalyst at a velocity sufficient to suspend or entrain the catalyst mass in the gas stream. Preferably, the velocity of the gas stream passing through the reaction zone is sufficiently low to maintain the catalyst mass in a dense, fluidized pseudo-liquid condition. However, the velocity may be sufficiently high to entrain at least a substantial proportion of the finely divided catalyst in the gas stream to form a continuous catalyst phase which circulates with the flowing gas stream, without departing from the scope of this invention. In the former condition the catalyst mass may be said to be suspended in the gas stream, but not entrained therein in the sense that there is movement of the catalyst mass as such in the direction of flow of the gas stream. When operating with the catalyst in the pseudo-liquid condition, it is preferred to maintain the upward velocity of the gas stream sufficiently high to maintain the fluidized catalyst mass in a highly turbulent condition in which the catalyst particles circulate at a high rate in the pseudo-liquid mass. In this pseudo-liquid condition of operation a small proportion of catalyst in the fluidized mass may become entrained in the gas stream emerging from the upper surface of the fluidized mass whereby catalyst thus entrained is carried away from the mass.

In the present process it is preferred to employ the hydrogen and carbon oxide in ratios such that there is an excess of hydrogen. Therefore, the charging rate in the present process is defined by reference to the rate at which the carbon oxide is charged, in terms of standard cubic feet, in the gas form, of the carbon oxide, per hour per pound of the metal catalyst in the dense pseudo-liquid mass of catalyst in the reaction zone. The fluidized process is operated at a minimum space velocity equivalent to charging rate of about 1.0 standard cubic foot of the carbon oxide reactant, per hour per pound of the metal catalyst in the dense catalyst phase. A standard cubic foot of the carbon oxide is that quantity of a normally gaseous carbon oxide which would occupy one cubic foot at atmospheric pressure at 60° F., or an equivalent quantity of a normally liquid carbon oxide reactant.

The catalyst employed in the present invention is a finely divided powder comprising a metal and/or metal oxide, which is, or becomes in the reaction zone, a catalyst for the reaction, or a mixture of such metal or metal oxide and other catalytic materials or noncatalytic materials. Finely divided metallic iron or a mixture of metallic iron and iron oxide is the preferred catalyst of this invention. Other metals and metallic oxides may be employed which are effective in catalyzing the hydrogenation of carbon monoxide, such as cobalt and nickel or their oxides, and other metals and their oxides of group VIII of the periodic table. While the catalyst powder consists essentially of such catalytic metal or metal oxide, it may include also a minor amount of promoting or supporting ingredients, such as alumina, silica, titania, thoria, manganese oxide, magnesia, alkalis, etc.

In this specification and claims the catalyst employed is described by reference to its chemical condition when first contacted with the reactants. Preferably, the powdered catalyst initially contains no more than a minor proportion by weight of material whose particle size is greater than 250 microns. Preferably also, the greater proportion of the catalyst mass comprises material whose particle size is smaller than 100 microns, including at least 25 weight per cent of the material in particle sizes smaller than 40 microns. A highly desirable powdered catalyst comprises at least 75 per cent by weight of material smaller than 150 microns in particle size, and at least 25 per cent by weight smaller than about 40 microns in particle size.

In the preferred form of the invention with the catalyst present in a pseudo-liquid condition, the powdered catalyst mass is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the catalyst concentration is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. The latter is the velocity at which the gas stream would flow through the reactor in the absence of catalyst. In the dense phase the concentration of the catalyst in the gas stream may vary somewhat from a maximum near the gas inlet to a minimum in the upper part of this phase. Likewise, the concentration of catalyst in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This zone has the appearance of an interface between two visually distinct phases.

This operation ordinarily involves employment of catalyst powders and gas velocities such that a relatively small proportion of the dense fluidized catalyst mass is carried away by entrainment, and it is necessary, therefore, to provide means in the reactor for separating such entrained catalyst and returning it to the dense phase, or to provide means externally of the gas reactor to separate entrained catalyst from the gas stream and return it to the reactor, or otherwise to recover catalyst from the effluent gas stream.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The pseudo-liquid operation in which the finely powdered catalyst is employed in a form consisting of preferably a metallic iron catalyst and containing at most minor proportions of promoting agents provides very high catalyst concentrations in the reaction zone. The employment of the finely powdered metal catalyst in a fluidized bed with efficient cooling means also is a factor in permitting the use of high catalyst concentrations, since it facilitates the removal of heat from the relatively concentrated reaction zone. The pseudo-liquid operation, employing the finely divided metal catalyst, results in initial catalyst concentrations of at least 30 pounds per cubic foot of the fluidized dense catalyst phase, while the preferred gas velocities result in initial concentrations of 40 to 120, or more, pounds per cubic foot of dense phase. It will be understood that these figures refer to the initial average concentration in the dense phase. The accumulation of reaction products on the catalyst particles as the operation proceeds reduces the catalyst density and increases the bulk of the dense fluidized mass. When the velocity of the gases flowing through the reaction zone are sufficiently high such that the catalyst is entrained rather than suspended and the conventional pseudo-liquid catalyst phase is not formed, a catalyst concentration less than about 18 pounds per cubic foot of gas, usually between about 3 and about 12 pounds per cubic foot of gas, is obtained in the reaction zone. Thus, for velocities above about 8 feet per second, a catalyst concentration of less than about 18 pounds per cubic foot of gas will result.

With an iron catalyst temperatures in the range of about 350° F. to about 750° F. are employed, while temperatures below 450° F. may be employed with a cobalt catalyst. Pressures between atmospheric pressure and the maximum pressure at which condensation is avoided may be employed with either catalyst. It is desirable, however, to employ pressures of at least 50 p. s. i. and preferably about 150 to about 500 p. s. i.

In this specification, pressures are expressed as pounds per square inch gage and gas volumes as cubic feet measured at 60° F. and atmospheric pressure.

The linear velocity of the gas stream passing upwardly through the dense phase is conveniently expressed in terms of the superficial velocity, which is the linear velocity the charge gas stream would assume if passed through the reactor in the absence of catalyst. This superficial velocity takes into account the shrinkage in volume caused by the reaction and is, preferably, in the range of from 0.5 to 6 feet per second. When operating with a continuous catalyst phase in which the catalyst is entrained in the flowing gaseous mixture, velocities as high as 40 feet per second may be used.

The reactants are passed into and through the reaction zone at a space velocity equivalent to at least 1.0 standard cubic foot of the carbon oxide per hour per pound of metal catalyst in the dense catalyst phase. In the hydrogenation of carbon monoxide with the iron catalyst it is preferred to operate at a space velocity equivalent to at least 4.0 standard cubic feet of carbon monoxide per hour per pound of iron catalyst in the dense catalyst phase. The charging rate is defined by reference to the carbon monoxide reactant, since the mol ratio of the hydrogen reactant to the carbon monoxide reactant in the charge gas may vary within wide limits. This ratio of hydrogen to carbon monoxide is usually in excess of about 0.7:1 and preferably at least 1:1 and often as high as 10:1. At the 1:1 ratio the preferred charging rate of hydrogen and carbon monoxide would, therefore, be at least 8.0 standard cubic feet per hour per pound of iron catalyst in the dense catalyst phase. At a 2:1 ratio this preferred rate would be at least 12.0 standard cubic feet of hydrogen and carbon monoxide.

The volume of reactants per hour per volume of dense pseudo-liquid catalyst phase depends upon the charge rate and also upon the concentration of catalyst in the dense phase, the latter being affected by the condition of the catalyst and the gas velocity. At the preferred gas velocities mentioned above for the pseudo-liquid operation, and when employing an iron catalyst, the minimum space velocity may be defined as 1 cubic foot of carbon monoxide per hour per pound of iron catalyst.

According to this invention a fresh feed gas having an $H_2$:CO ratio higher than the ratio in which these compounds are converted to other compounds is employed and the ratio of hydrogen to carbon monoxide in the charge to the reactor is increased to the desired figure by recycling a portion of the effluent before condensation thereof. A gas containing excess hydrogen is processed under conditions effective to react substantially all or a major proportion of the carbon monoxide, and a portion of the effluent from the reaction zone prior to condensation is recycled in volumetric ratios, to the fresh feed gas, of 0.5:1 to 10:1, preferably between 1:1 and about 2:1.

Fluid operations are carried out at space velocities which are relatively high as compared to those which would be permissible in fixed catalyst bed operations under comparable operating conditions. This results from the excellent heat transfer capacity of the fluidized mass of finely divided iron or iron oxide and the effect of excess hydrogen in minimizing carbon formation. It is preferred to operate at whatever temperature level, in the range of 350° F. to 750° F., is necessary to effect high conversion of carbon monoxide, as well as high yields of desired products when treating a gas charge containing more hydrogen than carbon monoxide, at space velocities equivalent to at least 4 standard cubic feet of carbon monoxide per hour per pound of iron catalyst in the dense phase.

The invention will be described further by reference to the accompanying drawing in elevation which diagrammatically illustrates arrangement of apparatus employed in carrying out the present invention, and by reference to specific conditions of operations embodying the present invention in connection with the drawing.

In the drawing a suitable synthesis gas mixture is passed through conduit 4 into conduit 6. The synthesis gas mixture comprises hydrogen and carbon monoxide in a mol ratio between about 0.7:1 and about 3:1, preferably about 1:1.

The synthesis gas is obtained from any suitable source, such as the conversion of methane and steam in the presence of a nickel catalyst. Reactor 6 may comprise any conventional type of fluidized reaction chamber in which a finely divided metal hydrogenation catalyst, such as reduced iron, is suspended in the gaseous mixture flowing through the reactor. Reactor 6 may comprise a single conduit or a plurality of parallel conduits through which the reaction mixture flows. Since the hydrogenation of carbon monoxide is exothermic, the reaction chamber is cooled by heat exchange with a cooling fluid, such as Dowtherm, surrounding the reaction zone or reaction tubes therein. Various other methods for controlling the temperature of the reaction zone may be employed, without departing from the scope of this invention, such as by direct injection of a vaporizable liquid or a gas at a relatively low temperature into the reaction zone.

When the hydrogenation of carbon monoxide in reactor 6 is carried out under conditions such that the finely divided hydrogenation catalyst forms a pseudo-liquid dense phase of catalyst, the velocity of the gas passing through the reaction chamber is between about 0.5 and about 5 or 6 feet per second. The concentration of the catalyst in the reaction zone will usually range between about 40 and about 120 pounds per cubic foot of gas and will depend upon the gas velocity, the catalyst, and the deposition of wax and carbonaceous deposits on the catalyst. In dense phase operation a space velocity equivalent to at least 1 standard cubic foot of carbon oxide per hour per pound of metal catalyst is employed. When a dense phase of catalyst is present in reactor 6, a portion of the catalyst may be removed therefrom through standpipe 13 in the conventional manner and regenerated and/or cooled (not shown), such as by reduction with hydrogen or other reducing gas, and returned to zone 6 by means of conduit 14. Fresh catalyst may be introduced into the reactor 6 through conduit 14. Although substantially all of the catalyst remains in reactor 6 in the dense phase operation, a small amount of the catalyst will flow or be entrained with the gaseous effluent and removed from reactor 6 through conduit 7.

In order to remove this finely entrained catalyst from the effluent in conduit 7, a catalyst separation unit 8 is provided therefor. Catalyst separation unit 8 may comprise various methods for removing entrained catalyst from a gaseous effluent, such as cyclone separators, Cottrell precipitators, and oil scrubbing. The recovered catalyst may be returned to the reactor 6 through conduit 14 by means not shown. In case standpipe 13 is of insufficient length to pass catalyst directly therefrom into conduit 4 or reactor 6, a Fuller-Kinyon pump may be used.

When the hydrogenation of carbon monoxide is effected in reactor 6 under conditions such that a continuous phase of catalyst is present in reactor 6, and such that the conventional pseudo-liquid dense phase of catalyst is not present, the velocity of the gaseous mixture passing through reactor 6 is above about 6 feet per second and preferably between about 8 and about 40 feet per second. At such high velocities the catalyst concentration in reactor 6 will be between about 18 and about 3 pounds per cubic foot of gas. In the continuous phase operation, the catalyst and the effluent pass together from reactor 6 through conduit 7 into catalyst separation unit 8, which in this case may be a series of settling units and/or cyclone separators for the removal of the catalyst from the effluent. The separated catalyst is then recycled by means not shown to conduit 14 and reintroduced into the gas stream in conduit 4. A standpipe or a Fuller-Kinyon pump may be provided for the introduction of the catalyst from catalyst separation unit 8 into conduit 4.

When a reduced iron hydrogenation catalyst is used, the temperature of reaction is about 580° F. to 600° F. The synthesis gas introduced through conduit 4 is, however, introduced into reactor 6 at a temperature preferably below about 150° F., and may be introduced at approximately atmospheric temperature without any preheating. In order to maintain the temperature in reactor 6 at the desired level, a portion of the reaction effluent, which is usually at a temperature of about 600° F. to about 610° F., is recycled through conduit 9 to conduit 4. The sensible heat of the recycle effluent raises the temperature of the incoming synthesis gas sufficiently high such that a reaction is effected in reactor 6 and sufficient heat is liberated by the reaction to raise the average temperature to about 580° F. to 600° F. in reactor 6. The pressure of reactor 6 when using an iron catalyst is about 250 pounds per square inch gage. When a relatively cold synthesis gas feed is used and the temperature of reactor 6 is about 600° F., the volume ratio of recycle effluent to feed gas will be about 1:1 to about 2:1, preferably about 1.5:1. The effect of the recycle of the effluent is not only to raise the temperature of the feed to reactor 6, but it also results in an increase in the hydrogen to carbon monoxide ratio in reactor 6. Although the mol ratio of hydrogen to carbon monoxide in the feed gas is only about 1.5:1, for example, recycling a portion of the effluent will increase the feed ratio to as much as 2:1 to 3:1, or even higher. Thus, the actual hydrogen to carbon monoxide ratio in reactor 6 is usually much higher than the ratio of hydrogen to carbon monoxide in the feed gas. In some instances it may be desirable to introduce a portion of the recycle directly into the reaction zone rather than into conduit 4, and this may be accomplished by passing the recycle gas through conduit 12. In some instances it may be desirable to introduce all of the recycle gas into reactor 6 through conduit 12. Cooling or heating means (not shown) may be provided in conduit 9 and/or conduit 12 for regulating the temperature of the recycle gas such that the desired temperature in reactor 6 may be attained. In the instances when the recycle gas is cooled, the temperature after cooling will be lower than the effluent temperature by about 50° F. to 100° F. However, if difficulty is experienced in maintaining a sufficiently high temperature in any part or zone of reactor 6, it may be necessary to heat the recycle gas and introduce all or a portion thereof into that zone.

The recycle gas is removed from the effluent prior to any condensation treatment of the effluent and either prior or subsequent to catalyst separation. When reactor 6 is operated under dense phase catalyst conditions, in most instances the recycle gas will be removed from the effluent prior to catalyst separation unit 8. On the other hand, when reactor 6 is operated under conditions of a continuous phase or high velocity process, the recycle gas usually is removed from the effluent subsequent to catalyst separation unit 8, such as through conduit 11.

After removal of the recycle gas from the effluent, and after the effluent has passed through catalyst separation unit 8, the remainder of the effluent is passed through conduit 16 to condenser 17 which may comprise a single or a series of condensation units. From condenser 17 the effluent is passed to an accumulator 18 in which one or more liquid phases are separated. The liquid phases comprising organic products of the process are removed therefrom through conduit 19 and subsequently treated for purification and recovery of organic products of the process by means not shown. Uncondensed vapors in accumulator 18 are removed through conduit 21. A portion of these uncondensed vapors may be recycled to reactor 6 if desired, but generally according to this invention most of the vapors are passed to subsequent recovery units for removal of valuable organic products of the process.

As shown in the drawing catalyst is introduced into a mixture of the recycle gas and fresh feed gas by means of which it is conveyed into reactor 6. Regenerated or fresh catalyst may be introduced directly into conduit 9, where it is conveyed into reactor 6 through conduit 4 or through conduit 12 without contact with cold feed gas.

It is a particular advantage and object of this invention to enable the introduction of catalyst into reactor 6 without contact with gas of a relatively lower temperature. Contact of relatively hot catalyst with relatively cold gas is often injurious to the catalyst and is thus to be avoided if possible. According to a particular modification of this invention, catalyst is introduced into the recycle gas stream prior to cooling thereof. The recycle gas stream and catalyst may in such modification be cooled together in a common cooling means rather than having a separate cooler for the recycle gas and another cooler for catalyst. Since reaction zone 6 may be cooled by removing a portion of the catalyst therefrom, cooling and returning it to the reactor, catalyst may be removed from reactor 6 through conduit 13 and introduced into recycle conduit 9. The recycle gas serves as a carrying medium for the catalyst and the resulting mixture is passed through a catalyst cooler (not shown) from which it is reintroduced into reactor 6.

Using a reduced iron catalyst under the conditions described in connection with the drawings, a conversion between about 70 and about 100 per cent of carbon monoxide has been observed. The oil and water yields have been as much as 100 and 120 cc./m.³, respectively. Substantial amounts of oxygenated compounds including alcohols and organic acids have been recovered from both the oil and water products.

Various modifications of the process and apparatus I have described may become obvious to those skilled in the art without departing from the scope of this invention. Certain heaters, pumps, condensers, etc., have been omitted from the drawing as a matter of clarity and convenience.

Having described my invention, I claim:

1. A process for producing organic compounds which comprises introducing a feed mixture comprising hydrogen and carbon monoxide in a mol ratio of hydrogen to carbon monoxide between about 0.7:1 and about 10:1 into a reaction zone, passing a gaseous mixture upwardly through said reaction zone at a velocity between about 0.5 and about 40 feet per second in the presence of a finely divided fluidized catalyst under conditions such that a major proportion of said carbon monoxide is converted, maintaining in said reaction zone a temperature between about 350° F. and about 750° F. and a pressure between about 50 and about 500 pounds per square inch gage, withdrawing a gaseous effluent from said reaction zone, recycling a portion of said gaseous effluent whose temperature is not lower than about 100° F. of the effluent temperature to said feed mixture which feed has a temperature between about atmospheric and about 150° F. in a volumetric ratio of recycle gas to fresh feed between about 1:1 and about 2:1, introducing hot regenerated catalyst into the resulting mixture of recycle gas and fresh feed whereby the temperature differential between catalyst and feed gases is decreased and catalyst is returned to said reaction zone, subsequently cooling and condensing unrecycled effluent and separating organic products therefrom as products of the process.

2. A process for hydrogenating carbon oxides which comprises continuously flowing a gaseous mixture comprising hydrogen and a carbon oxide upwardly in a reaction zone through a mass comprising a finely divided hydrogenation catalyst such that the catalyst mass is suspended in said upwardly flowing gaseous mixture and under conditions such that a major proportion of the carbon oxide is converted, passing said gaseous mixture through said mass at a velocity sufficiently low to maintain the mass in a dense fluidized pseudo-liquid condition but sufficiently high to produce a rapid circulation of catalyst particles in the mass, removing catalyst from said pseudo-liquid dense phase, withdrawing a gaseous effluent from said reaction zone after passage of said gaseous mixture through said dense catalyst mass, recycling a portion of said effluent prior to condensation thereof and at a temperature not lower than about 100° F. of the effluent temperature from said reaction zone to said reaction zone in a volumetric ratio of recycle to feed gas between about 0.5:1 and about 10:1, subsequently cooling and condensing unrecycled effluent and introducing hot separated catalyst into said recycle gas whereby the temperature differential between catalyst and conveying gases is decreased and catalyst is returned to said reaction zone.

3. A process for producing organic compounds which comprises introducing a feed mixture comprising hydrogen and carbon monoxide in a mol ratio of hydrogen to carbon monoxide between about 0.7:1 and about 10:1 into a reaction zone, passing a gaseous mixture upwardly through said reaction zone at a velocity between about 0.5 and about 40 feet per second in the presence of a finely-divided fluidized iron catalyst under conditions such that a major proportion of the carbon monoxide is converted, maintaining in said reaction zone an average temperature between about 580 and about 600° F. and a pressure between about 150 and about 500 pounds per square inch gage, withdrawing finely-divided catalyst and a gaseous effluent from said reaction zone, recycling a portion of said gaseous effluent prior to condensation thereof at an elevated temperature not less than about 100° F. of the temperature of the effluent from said reaction zone to said reaction zone in a volumetric ratio of recycle gas to fresh feed gas between about 0.5:1 and about 10:1, introducing hot catalyst withdrawn from said reaction zone into the uncondensed portion of said recycle gas which is at an elevated temperature whereby the temperature differential between hot catalyst and gases is maintained at a minimum and catalyst is returned to said reaction zone, and subsequently cooling and condensing unrecycled effluent and separating organic compounds therefrom as products of the process.

LUTHER R. HILL.

REFERENCES CITED

The following references are of record in the file of this patent:

UNITED STATES PATENTS

| Number | Name | Date |
|---|---|---|
| 2,279,052 | Michael et al. | Apr. 7, 1942 |
| 2,345,957 | Wirth et al. | Apr. 4, 1944 |
| 2,360,787 | Murphree et al. | Oct. 17, 1944 |
| 2,393,909 | Johnson | Jan. 29, 1946 |
| 2,417,164 | Huber, Jr. | Mar. 11, 1947 |
| 2,436,957 | Eastman | Mar. 2, 1948 |

Certificate of Correction

Patent No. 2,560,171                          July 10, 1951

LUTHER R. HILL

It is hereby certified that error appears in the printed specification of the above numbered patent requiring correction as follows:

Column 1, line 31, for "group VII" read *group VIII*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*